Feb. 12, 1935.  S. A. STAEGE  1,991,067
REGULATING SYSTEM
Filed Nov. 25, 1933
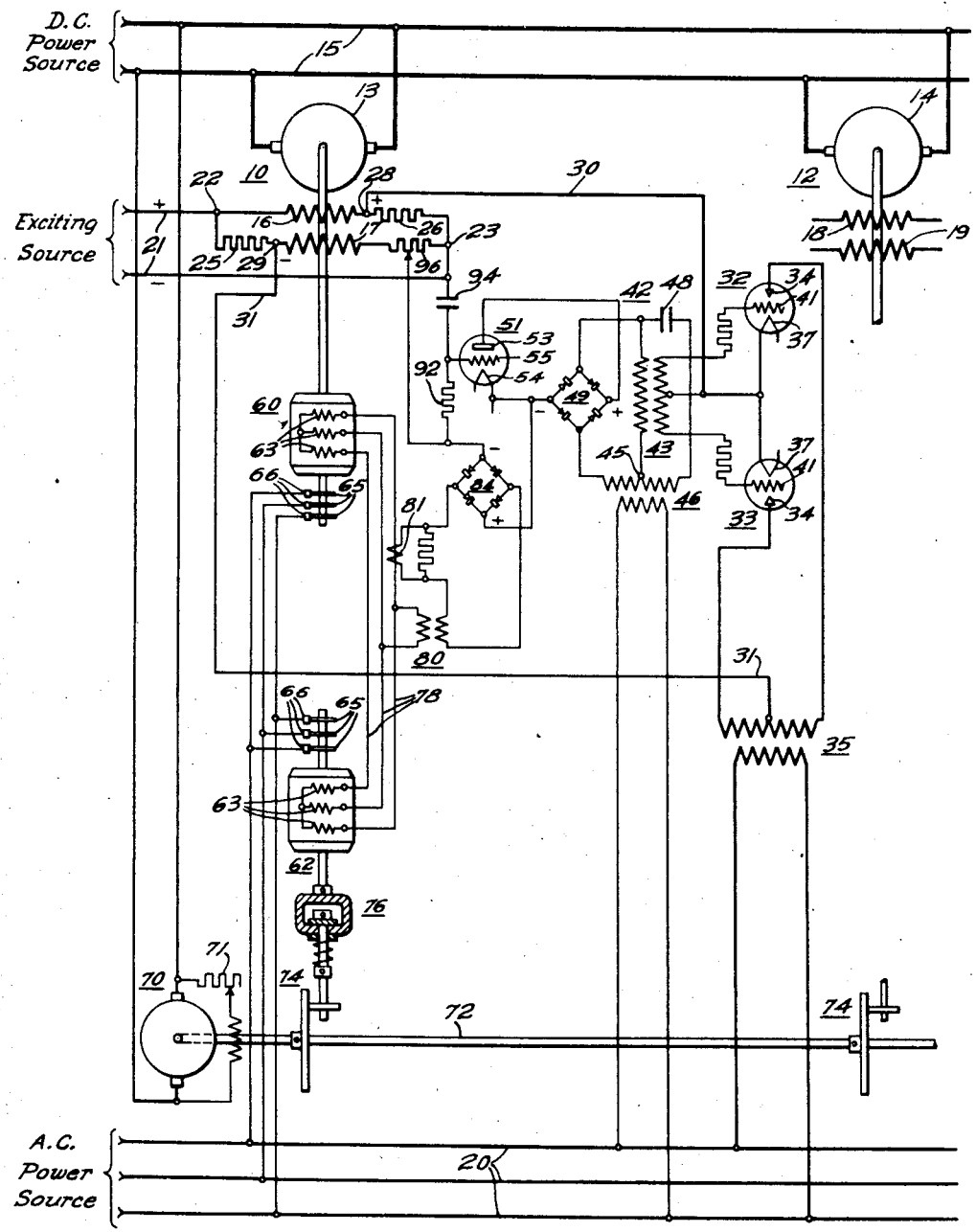
WITNESSES:
INVENTOR
Stephen A. Staege.
BY
ATTORNEY Patented Feb. 12, 1935

1,991,067

UNITED STATES PATENT OFFICE 1,991,067

REGULATING SYSTEM

Stephen A. Staege, Pittsburgh, Pa., assignor to Westinghouse Electric & Manufacturing Company, East Pittsburgh, Pa., a corporation of Pennsylvania Application November 25, 1933, Serial No. 699,751

4 Claims. (Cl. 172—293)

My invention relates to regulating systems and it has particular relation to improvements in systems adapted to maintain the speeds of a plurality of rotating machines in a predetermined relationship.

In certain applications where a plurality of separate driving motors are employed to propel different parts of a unitary machine, such, for example, as in paper making machines, steel rolling mills, and other machines comprising individually driven sections, it is essential that the speeds of the several section driving motors be very accurately maintained in predetermined relation.

In a copending application, Serial No. 699,750, filed November 25, 1933 by J. F. Peters, H. W. Reding and myself, there is shown and described a regulating system especially adapted for service of this type, which system causes each of the regulated motors to rotate at a speed that is in synchronous relation with the voltage of an alternating-current speed-setting machine or master circuit.

In that system each of the regulated motors, which are of the direct-current type, is provided with an electronic tube or other equivalent speed-adjusting means sensitive to changes in the current that circulates between a pilot source of alternating-current voltage, having a frequency proportional to the motor speed, and a master source of voltage, the frequency of which is proportional to the desired speed of the motor, with which master source the pilot source is suitably inter-connected.

The present invention is directed to improvements in this basic system of speed-regulation and it particularly contemplates a simplification or improvement in the apparatus required to convert changes in the speed-responsive current which circulates between the pilot and master voltage sources into a controlling influence suitable for impression upon the speed-adjusting means of the regulated machine.

One object of the invention is to provide an improved form of regulating system in which the speed of each of the regulating machines is determined by the frequency of the output voltage of a master or speed-setting machine.

Another object of the invention is to provide, in a regulating system of the type under consideration, improved means for converting changes in the circulating current which flows in the circuit connecting the pilot and master alternating-current voltage sources into a correspondingly changing control potential for impression upon motor speed-adjusting means.

A further object of the invention is the provision, in a regulating system of the type under consideration, of means whereby a continuous change in a unidirectional control potential will be obtained as the pilot voltage advances, in phase position with respect to the voltage of the master or speed-setting source, from the limiting lagging position, corresponding to a deviation below the desired value in motor speed, to the limiting leading position, corresponding to a deviation above the desired value in motor speed.

In practicing my invention, I provide in the circuit which interconnects the pilot and master generators associated with each of the regulated machines, a current and a voltage transformer the sum of the output voltage of which two transformers constitutes the control potential which is impressed upon the speed-adjusting means for the regulated machine. The connections of the transformers are so made that when the pilot voltage leads the master voltage in phase position the resulting circulating current will be substantially in phase with the voltage appearing between the conductors of the interconnecting circuit and the output voltages of both the current and voltage transformers will accordingly directly add to each other to produce a control potential of a relatively large value. When the pilot voltage lags the master voltage, however, the resulting circulating current will be shifted to a position 180° out of phase with the voltage appearing between conductors of the interconnecting circuit and the voltage produced by the current transformer will accordingly subtract from that produced by the voltage transformer, so that the summation or control potential will be correspondingly reduced.

The component supplied by the voltage transformer being of a relatively fixed magnitude, changes in the magnitude and phase position of the current transformer voltage, which directly result from variations in the regulating motor speed from the desired or effective synchronous value with respect to the frequency of the master voltage, act to produce continuous variations in the summation potential which is preferably rectified before being controllably impressed upon the speed-adjusting means.

My invention, together with additional objects and advantages, will best be understood from the following description of a specific embodiment thereof, when taken in conjunction with the accompanying drawing in which the single figure is a diagrammatic representation of apparatus and circuits comprised by a preferred embodiment shown as being applied to a regulating system adapted to control the speeds of a plurality of direct-current motors.

Referring to the drawing, the regulating system there shown, to which the improved control means of my invention are illustrated as being applied, is essentially the same as that disclosed and claimed in the copending application before mentioned. Considering first a general description of this regulating system, two of the plurality of direct-current motors whose speeds are to be regulated are illustrated at 10 and 12. The motors respectively comprise armature windings 13 and 14, that are suitably connected for energization from a source of direct-current power illustrated as circuit conductors 15, and field windings 16—17 and 18—19 which derive the controllable portion of their energization from rectified current supplied from an alternating-current power source represented as the conductors 20.

The provision of the two field windings for each of the regulated motors is for the purpose of reducing the magnitude of exciting current which must be supplied through the speed-control equipment and also to prevent overspeed in the event of failure of this equipment. As is more completely explained in the copending application referred to, these two field windings derive the major portion of their energization from a suitable source of constant potential direct-current power, such as an exciting generator or the like. In the connection shown, a circuit identified by conductors 21 constitutes this source and supplies current to diagonally opposite points 22 and 23 of a four element interconnection comprising the two field windings 16 and 17 and a pair of resistors 25 and 26.

Connected to the remaining diagonal points 28 and 29 of the interconnection are conductors 30 and 31 comprised by the output circuit of the speed-control equipment which acts to change the motor excitation to thereby effect speed adjustment. As an examination of the diagram will reveal, when the polarities of the two supply sources are as indicated, current supplied through conductors 30 and 31 will oppose that which flows through the two windings 16 and 17 from the major energizing source 21 and will thereby effect a reduction of the excitation to control the motor speed.

In the regulating system illustrated the speed of each of the regulated motors is compared, through the utilization of a pilot alternating-current generator, with that of a master alternating-current generator which is driven at a rate definitely related to the desired speed of the regulated motor. In the case of motor 10 this pilot generator is illustrated at 60 as being directly driven by the motor, while the master generator, which sets the speed at which the motor will be maintained, is illustrated at 62. While machines 60 and 62 are shown as induction generators which, in mechanical construction, may be similar to wound-rotor induction motors, it will be understood that they may also be of the well-known synchronous or direct-current excited type.

As illustrated, each of these generators comprises three-phase stator windings 63, and three-phase rotor windings (not shown), the connections of which are brought out to slip rings 65. The machine rotor windings are shown as being excited from the three-phase power source 20 by means of direct connections therewith established through brushes 66. The generators 60 and 62 are driven at speeds which are somewhat different from the synchronous values determined by the frequency of the exciting source 20, in order that there may be induced in the stator windings 63 voltages of a frequency suitable for the regulating service.

Each of the additional direct-current motors to be regulated is similarly provided with a pilot generator, comparable to machine 60 shown in association with motor 10, which cooperates with a master generator, comparable to machine 62, to control the motor speed-adjusting equipment with a duplicate of that shown in association with motor 10 each of these additional motors is provided.

These several master generators are driven at predeterminedly related speeds by any suitable means illustrated in the drawing in the form of a direct-current motor 70. As shown, this motor is energized from the direct-current power source 15 and is provided with a speed-changing rheostat 71. The motor drives, by means of a shaft 72, the master generators through speed-changing mechanisms 74 which may be any one of a number of well-known types.

Between each of the master generators and its driving means is disposed a slip clutch device, shown in the case of generator 62 at 76. As more completely explained in the copending application mentioned, the function of this device is to prevent the pilot and master generators from being pulled out of step in the event that the speed variation of the regulated motor becomes excessive, and the device further functions to facilitate the starting of the regulated machines.

The output or stator windings 63 of the pilot and master generators are directly interconnected by means of circuit conductors 78, each set of generator windings being illustrated as star-connected. When the output voltages of the two machines have a complete in-phase relation with respect to each other, the current flowing in conductors 78 will be substantially zero and will set up practically no synchronizing torque. However, as departure from this in-phase relation is made, a synchronizing current will circulate through circuit 78 the magnitude of which is a direct function of the phase displacement. This current sets up as before explained, a synchronizing torque which must be transmitted by the generator driving shafts, in one of which is placed the slip-clutch device 76 to restrict the driving torque below the pull-out value under all conditions.

Considering now the speed-adjusting apparatus illustrated in association with the motor 10, this equipment comprises a pair of electronic tubes or other equivalent devices, such as liquid-pool cathode rectifiers provided with make-alive elements which must be excited to institute conduction during each positive half cycle of anode voltage, which act as controllable means for rectifying current delivered from the power source 20. These devices are shown at 32 and 33 as having anode elements 34 connected to opposite ends of the secondary winding of a transformer 35, the primary winding of which transformer is directly connected to supply conductors 20. The cathode elements 37 of the devices are joined together and connected through conductor 30 to point 28 in the motor field winding interconnection, the diagonally opposite point 29 of which interconnection is joined, by means of conductor 31, to the mid-tap of the secondary winding of transformer 35.

Devices 32 and 33 are illustrated as grid-controlled gas-filled tubes, each of which is capable of conducting current only from the anode to the cathode element. Thus tube 32 will pass current during alternate half cycles of the voltage acting in transformer 35, while tube 33 will similarly pass current during the remaining half cycles, full-wave rectification thus being effected by the combination.

The effective value of this rectified current supplied to the motor windings is controlled by changing the characteristics of the potential impressed upon the tube grid elements 41. If this potential is an alternating-current one having a frequency equal to that of the power source voltage impressed upon the tube anode elements, changes in phase displacement will effect, through a wide range, an adjustment of the effective conductivity of the tubes. Thus, when this displacement is slight, conduction will be instituted at an early point in each positive half cycle and continuing as it does, during the remainder of that half cycle, the effective current passed by the tubes will be maximum. However, as the displacement of the grid voltage will respect to the tube anode voltage is made to approach 180°, the conduction starting point will be progressively delayed, with a resulting decrease in effective tube conductivity.

To supply this control potential, there is provided a phase-shifting bridge circuit 42 which comprises a grid-influencing transformer 43 connected between the mid-point 45 of the secondary winding of a transformer 46 and a conductor joining a capacitor 48 with a full-wave rectifier 49. The capacitor and rectifier of the bridge circuit are connected in series for energization by the transformer 46, the primary winding of which transformer is energized from the alternating current circuit 20. The amount of phase-shift between the voltage of transformer 43 of the bridge circuit and that of the supply circuit 20 is controlled by varying the effective resistance of the rectifier 49, which variation in the system of my invention is effected through the medium of an electronic tube 51.

Tube 51 is preferably of a well-known continuous control or vacuum type which comprises anode and cathode elements 53 and 54 connected in the output circuit of rectifier 49 and a control or grid element 55 on which is impressed a potential which varies in accordance with deviations from the desired value in the speed of regulated motor 10. To produce this control potential the improved control means of my invention are utilized in the manner shown in the drawing.

In association with the circuit 78 which interconnects pilot generator 60 with master generator 62, I provide a potential or voltage transformer 80 and a current transformer 81, the combined output voltages of which two transformers are impressed upon a rectifying device 84, which converts this alternating-current summation potential into a direct-current voltage for impression between the grid and cathode elements of electronic tube 51. In the connection shown the polarity of this rectified voltage is such that the tube grid element 55 is maintained at a negative potential with respect to the cathode element 54.

The voltage transformer 80 is shown as being energized by the voltage appearing between two of the three generator inter-connecting conductors 78, while current transformer 81 is acted upon by the current flowing in one of these two conductors. As is known, when two alternators, such as represented at 60 and 62, are inter-connected in the manner shown, the synchronizing current which flows between them as a result of displacements between their internal voltages, is substantially in phase with the voltage appearing between the connecting circuit conductors for one direction of alternator displacement, and substantially 180° out of phase with this voltage for the opposite direction of displacement. In the control means of my invention illustrated, this principle is utilized to effect the desired adjustments in the magnitude of a control potential as the phase displacement of generator 60, with respect to generator 62, advances from one limiting torque position through zero to the opposite limiting torque position.

The voltage transformer 80 supplies to the input circuit of rectifier 84 a voltage which is substantially constant regardless of the fluctuations in phase position of the two generators 60 and 62, and the current transformer 81 supplies to the circuit a voltage which preferably has a maximum magnitude somewhat less than the output voltage of transformer 80. When this current transformer voltage is maximum and in phase with that of transformer 80 the summation potential impressed upon rectifier 84 will of course be maximum. As the magnitude of the current transformer voltage is reduced through zero and built up in the opposite or 180° displacement direction this summation potential will be progressively reduced. The output voltage of rectifier 84, controllably impressed upon electronic tube 51, directly follows these changes in magnitude and thereby functions to adjust the speed of the regulated motor 10 in a manner to maintain pilot generator 60 in synchronism with speed-setting machine 62.

Consequently, in operation of the complete regulating system illustrated in the drawing, at the desired speed of motor 10 the voltage of pilot generator 60 is substantially in phase with that of master generator 62 and the current which is caused to flow in circuit 78 is practically zero. The control potential supplied to tube 51 through rectifier 84 then comprises only the output voltage of transformer 80 since the current transformer 81 is relatively inactive. The resulting intermediate value of negative grid bias applied to vacuum tube 51 maintains the effective resistance of rectifier 49, of phase-shifting bridge circuit 42, at the intermediate value which keeps the excitation of motor 10, controlled by electronic tubes 32 and 33, at the desired-speed adjustment.

A decrease in the speed of the regulated motor 10 similarly slows down the pilot generator 60 and causes its voltage to lag behind that of the master generator 62. As a result, there is set up in circuit 78 a circulating current which, as before assumed, is 180° out of phase with the voltage which appears between the two conductors 78 to which transformer 80 is connected. This produces in current transformer 81 a voltage which, in the supply circuit of rectifier 84, directly subtracts from that of voltage transformer 80 and thereby decreases the negative bias applied to tube 51. This raises the tube conductivity and by thus lowering the effective resistance of rectifier 49 lowers the displacement angle of grid voltage applied to speed control tubes 32 and 33. The raised conductivity of these tubes acts to lower, in the system shown, the motor excitation, and thus raises the speed of motor 10 back to the desired value.

Upon the occasion of an increase in motor speed pilot generator 60 tends to similarly speed up so that its voltage leads in phase position the voltage of master generator 62. This sets up in circuit 78 a circulating current which in phase position coincides substantially with the voltage appearing between the conductors of circuit 78 to which voltage transformer 80 is connected. This current produces in transformer 81 a voltage which, upon being introduced into the supply circuit of rectifier 84, directly adds to that of voltage transformer 80 and thereby increases the negative bias applied to the grid element of tube 51. The lowered conductivity of this tube raises the effective resistance of rectifier 49 which causes bridge circuit 42 to increase the displacement angle of grid voltage impressed upon speed control tubes 32 and 33. The resulting lowered conductivity acts to raise, in the system shown, the motor excitation and thus reduces the speed of motor 10 back to the desired value.

In order to improve the stability of the regulating system, anti-hunting means may, if desired or found necessary, be combined therewith. As shown in association with motor 10, a preferred form of such means comprises a resistor 92 disposed in the grid energizing circuit of vacuum tube 51 which resistor is connected in series with a capacitor 94 for energization by the voltage appearing across a portion of a resistor 96 connected in series with one of the field windings of the regulated motor. This particular arrangement is comparable to that shown and described in a copending application, Serial No. 543,514 by J. H. Ashbaugh and F. H. Gulliksen, filed June 11, 1931. As explained in that application, a change in the energizing current of the motor field winding 17, and hence the voltage appearing across resistor 96, causes the capacitor 94 to draw a current through resistor 92. The voltage drop set up in the resistor by this current is of such polarity that the excitation adjustment which produced it will tend to be retarded, such retardation resulting from a modification of the grid bias of vacuum tube 51. The magnitude of this modification, furthermore, is directly dependent upon the rate of change of motor excitation which is an exceedingly desirable characteristic in any stabilizing system.

The explanation of operation just given relative to regulating the motor 10 also applies to the motor 12 which, as before stated, is provided with duplicate speed-control equipment, and to any additional motors which may be similarly controlled. By adjusting, through a change in the setting of the speed-changing device 74, the relative rates at which the master generators are driven, comparable adjustments in the relative speeds at which the several motors will be maintained may be effected. Hence, without changing the speed of the master driving shaft 72, the speeds of the several regulated machines may be varied relative to each other. When it is desired to raise or lower the speeds of all of the regulated motors in a similar manner, or in the same proportion, this may be done by appropriately varying the speed of master generator driving motor 70.

Although I have shown and described a certain specific embodiment of my invention, I am fully aware that many modifications thereof are possible. My invention, therefore, is not to be restricted except insofar as is necessitated by the prior art and by the scope of the appended claims.

I claim as my invention:

1. A speed-regulating system for a rotating machine comprising, in combination, a master source of alternating-current voltage of speed-setting frequency, a pilot source of voltage having a frequency proportional to the actual speed of the machine, a circuit for interconnecting said two sources, speed-adjusting means for the machine comprising an electronic tube, and means for impressing upon said tube a unidirectional control potential which varies with the phase position and magnitude of the current which a phase displacement between the voltages of said two sources causes to flow in said interconnecting circuit.

2. A speed-regulating system for a rotating machine comprising, in combination, a master source of alternating-current voltage of speed-setting frequency, a pilot source of voltage having a frequency proportional to the actual speed of the machine, a circuit for interconnecting said two sources, a transformer energized by the current which flows in said circuit, a rectifier, a circuit for impressing upon said rectifier the sum of the voltage appearing in said circuit and the output voltage of said transformer, speed-adjusting means for the machine, and a circuit for controllably impressing upon said means the unidirectional output potential of the rectifier, which potential varies with the phase displacement between the voltages of said two sources.

3. A speed-regulating system for a rotating machine comprising, in combination, a master source of alternating-current voltage of speed-setting frequency, a pilot source of voltage having a frequency proportional to the actual speed of the machine, a circuit for interconnecting said two sources, speed-adjusting means for the machine comprising an electronic tube, and means for impressing upon said tube a unidirectional control potential which varies with the phase position and magnitude of the current which a phase displacement between the voltages of said two sources causes to flow in said interconnecting circuit, said means comprising a transformer energized by the voltage of the interconnecting circuit, a second transformer energized by the current flowing in the circuit, a rectifier, a circuit for impressing upon said rectifier the sum of the output voltages of said two transformers, and an output circuit for the rectifier connected with said tube.

4. Regulating apparatus comprising a pair of interconnected alternating-current voltage sources, quantity-adjusting means comprising an electronic tube, and means for impressing upon said tube a unidirectional control potential which varies with the phase displacement between the voltages of said two sources, said means comprising a transformer energized by the voltage of said sources, a second transformer energized by the current which flows between the sources, a circuit into which is introduced the output voltages of said two transformers, a rectifier energized from said circuit, and means for impressing the output voltage of the rectifier upon said tube, said rectifier voltage constituting the desired unidirectional control potential.

STEPHEN A. STAEGE.